US008443083B2

(12) United States Patent
Khushu et al.

(10) Patent No.: US 8,443,083 B2
(45) Date of Patent: May 14, 2013

(54) ARBITRATION OF RESOURCES AT A WIRELESS DEVICE AMONG CONTENDING APPLICATIONS

(75) Inventors: Sanjeev Khushu, San Diego, CA (US); Sriram Nagesh Nookala, San Diego, CA (US); Simon Turner, San Diego, CA (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 666 days.

(21) Appl. No.: 11/414,664

(22) Filed: Apr. 27, 2006

(65) Prior Publication Data

US 2007/0099640 A1 May 3, 2007

Related U.S. Application Data

(60) Provisional application No. 60/678,149, filed on May 4, 2005.

(51) Int. Cl.
*G06F 15/173* (2006.01)

(52) U.S. Cl.
USPC ........... 709/226; 709/223; 709/236; 709/230; 709/228; 709/225; 455/441; 370/466; 370/489; 370/465; 370/474; 370/215; 370/326; 370/329; 370/401; 370/437; 370/278; 370/312; 370/331; 701/482; 707/999.01; 710/305; 375/134; 375/E1.033; 380/34

(58) Field of Classification Search .................. 709/206, 709/226, 227, 228, 240, 223; 455/502; 718/103; 370/466; 1/1; 380/34
See application file for complete search history.

(56) References Cited

U.S. PATENT DOCUMENTS

| 5,506,863 | A | * | 4/1996 | Meidan et al. ............... 375/134 |
| 5,629,981 | A | * | 5/1997 | Nerlikar ....................... 713/168 |
| 6,421,538 | B1 | * | 7/2002 | Byrne ........................... 455/441 |
| 6,738,373 | B2 | | 5/2004 | Turner | |

(Continued)

FOREIGN PATENT DOCUMENTS

| JP | 2001069570 | 3/2001 |
| JP | 2002064576 | 2/2002 |

(Continued)

OTHER PUBLICATIONS

Golla et al., "QoS mechanism for prioritized flow-control for network elements handling high-speed traffic", 2003.*

(Continued)

*Primary Examiner* — Ondrej Vostal
(74) *Attorney, Agent, or Firm* — Kenyon Jenckes; Kristine U. Ekwueme

(57) ABSTRACT

Multiple applications sharing common resources are arbitrated such that failures resulting from unavailable resources can be avoided. Whenever an application (e.g., a data application) desires to perform an operation (e.g., PPP resynchronization) that requires the use of a shared resource (e.g., an RF receiver), a determination is made as to whether that resource is available. The operation may be delayed while the resource is unavailable. The application may be assigned the resource if it is available or becomes available and may then start the operation. The resource is locked while the operation is pending to avoid assignment to another application. The resource arbitration allows applications to complete their operations without encountering failures due to other applications taking over the resources.

63 Claims, 6 Drawing Sheets

U.S. PATENT DOCUMENTS

| | | | |
|---|---|---|---|
| 6,813,673 B2 * | 11/2004 | Kotlowski et al. | 710/305 |
| 6,826,405 B2 * | 11/2004 | Doviak et al. | 455/445 |
| 6,886,163 B1 * | 4/2005 | Peacock et al. | 718/104 |
| 6,907,243 B1 * | 6/2005 | Patel | 455/442 |
| 6,954,800 B2 * | 10/2005 | Mallory | 709/240 |
| 7,207,041 B2 * | 4/2007 | Elson et al. | 718/104 |
| 7,215,648 B2 * | 5/2007 | Sullivan | 370/278 |
| 7,289,514 B2 * | 10/2007 | Robotham et al. | 370/395.4 |
| 7,406,324 B1 * | 7/2008 | McConnell | 455/466 |
| 7,606,938 B2 * | 10/2009 | Roese et al. | 709/242 |
| 2002/0025832 A1 * | 2/2002 | Durian et al. | 455/556 |
| 2002/0058499 A1 * | 5/2002 | Ortiz | 455/412 |
| 2002/0067707 A1 * | 6/2002 | Morales et al. | 370/331 |
| 2002/0087716 A1 * | 7/2002 | Mustafa | 709/236 |
| 2002/0115407 A1 * | 8/2002 | Thompson et al. | 455/3.01 |
| 2003/0014521 A1 * | 1/2003 | Elson et al. | 709/225 |
| 2003/0039268 A1 * | 2/2003 | Chong et al. | 370/466 |
| 2003/0055975 A1 * | 3/2003 | Nelson et al. | 709/227 |
| 2003/0103524 A1 * | 6/2003 | Hasegawa | 370/465 |
| 2003/0110202 A1 | 6/2003 | Shitahaku | |
| 2003/0189951 A1 * | 10/2003 | Bi et al. | 370/503 |
| 2004/0002974 A1 | 1/2004 | Kravitz et al. | |
| 2004/0008660 A1 * | 1/2004 | Lee | 370/349 |
| 2004/0039504 A1 * | 2/2004 | Coffee et al. | 701/35 |
| 2004/0059821 A1 * | 3/2004 | Tang et al. | 709/228 |
| 2004/0077356 A1 * | 4/2004 | Krenik et al. | 455/450 |
| 2004/0078374 A1 * | 4/2004 | Hamilton | 707/10 |
| 2004/0131125 A1 * | 7/2004 | Sanderford et al. | 375/261 |
| 2004/0215773 A1 * | 10/2004 | Strait et al. | 709/225 |
| 2004/0246891 A1 * | 12/2004 | Kay et al. | 370/215 |
| 2004/0249571 A1 * | 12/2004 | Blesener et al. | 701/301 |
| 2005/0002354 A1 * | 1/2005 | Kelly et al. | 370/329 |
| 2005/0015493 A1 * | 1/2005 | Anschutz et al. | 709/226 |
| 2005/0021713 A1 * | 1/2005 | Dugan et al. | 709/223 |
| 2005/0044205 A1 * | 2/2005 | Sankaranarayan et al. | 709/223 |
| 2005/0213555 A1 * | 9/2005 | Eyuboglu et al. | 370/349 |
| 2006/0120397 A1 * | 6/2006 | Kreiner et al. | 370/437 |

FOREIGN PATENT DOCUMENTS

| | | | |
|---|---|---|---|
| JP | 2002310692 | | 10/2002 |
| JP | 2003078941 | | 3/2003 |
| JP | 2003526294 | | 9/2003 |
| JP | 2005109899 | A | 4/2005 |
| WO | WO2004008693 | | 1/2004 |
| WO | WO 2004008693 | A1 * | 1/2004 |
| WO | WO2005004354 | | 1/2005 |
| WO | WO 2005004354 | A1 * | 1/2005 |

OTHER PUBLICATIONS

Lin et al., "Reliability and Stability Survey on CAN-based Avionics Network for Small Aircraft", 2005.*

International Search Report and Written Opinion—PCT/US2006/017298, International Search Authority—European Patent Office—Mar. 30, 2007.

Tanenbaum A S : "Operating Systems : Design and Implementation, Passage" 1987, Operating Systems. Design and Implementation, Englewood Cliffs, Prentice Hall, US, pp. 116-123 , XP002258861 pp. 122,123.

Tanenbaum A S: "Operating Systems: Design and Implementation" 1987, Operating Systems. Design and Implementation, Englewood Cliffs, Prentice Hall, US, pp. 51-76 , XP002023005 pp. 53-67.

* cited by examiner

400

| Shared Resources | Locked | Assigned Application | Waiting Applications |
|---|---|---|---|
| RF Receiver | Yes | Data | GPS |
| DSP | No | | |
| ⋮ | ⋮ | ⋮ | ⋮ |

| Application | Shared Resources | | |
|---|---|---|---|
| | RF Receiver | DSP | |
| Data | X | X | ••• |
| GPS | X | | ••• |
| ⋮ | ⋮ | ⋮ | ⋱ |

ARBITRATION OF RESOURCES AT A WIRELESS DEVICE AMONG CONTENDING APPLICATIONS

The present application claims priority to provisional U.S. Application Ser. No. 60/678,149, entitled "THROTTLING ALGORITHM FOR DATA SESSION WITH RESOURCE CONTENTION," filed May 4, 2005, assigned to the assignee hereof and incorporated herein by reference.

BACKGROUND

I. Field

The present disclosure relates generally to communication, and more specifically to techniques for controlling use of resources at a wireless device.

II. Background

Wireless communication networks are widely deployed to provide various communication services such as voice, data, video, broadcast, messaging, and so on. These networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal Frequency Division Multiple Access (OFDMA) networks.

A wireless device (e.g., a cellular phone) may establish a data session with a first wireless network to obtain data service. The wireless device may be roaming and may enter the coverage of a second wireless network. The wireless device may attempt to hand off the data session from the first wireless network to the second wireless network, e.g., if the second wireless network has better data capability and is more preferred than the first wireless network. The handoff process may fail for various reasons. If the handoff fails, then the pending data session may be lost, and the wireless device may need to establish a new data session, which may be highly undesirable.

SUMMARY

Techniques for arbitrating between multiple applications sharing common resources are described herein. These techniques may be able to avoid failures resulting from unavailability of resources. Whenever an application (e.g., a data application) desires to perform an operation (e.g., PPP resynchronization) that requires the use of a shared resource (e.g., an RF receiver), a determination is made as to whether that resource is available. The operation may be delayed while the resource is unavailable. The application may be assigned the resource if it is available or becomes available and may then perform the operation. The resource is locked while the operation is pending to avoid assignment to another application. This resource arbitration allows applications to complete their operations without encountering failures due to other applications taking over the resources.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIGS. 4A and 4B show a resource table and an application table, respectively.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The resource arbitration techniques described herein may be used for various wireless communication networks. For example, these techniques may be used for CDMA networks, TDMA networks, FDMA networks, OFDMA networks, wireless local area networks (WLANs), and so on. A CDMA network may implement a radio technology such as cdma2000, Wideband-CDMA (W-CDMA), and so on. cdma2000 covers IS-2000, IS-95, and IS-856 standards. A Universal Mobile Telecommunication System (UMTS) network is a multiple-access network that implements W-CDMA. A TDMA network may implement a radio technology such as Global System for Mobile Communications (GSM), Digital Advanced Mobile Phone System (D-AMPS), and so on. These various radio technologies and standards are known in the art.

For clarity, the resource arbitration techniques are specifically described below for cdma2000. The cdma2000 family of standards is described in publicly available documents from an organization named "3rd Generation Partnership Project 2" (3GPP2). IS-2000 Releases 0 and A are commonly referred to as CDMA2000 1X (or simply, 1X), and IS-856 is commonly referred to as CDMA2000 1xEV-DO (or simply, 1xEV-DO).

Figure 1:
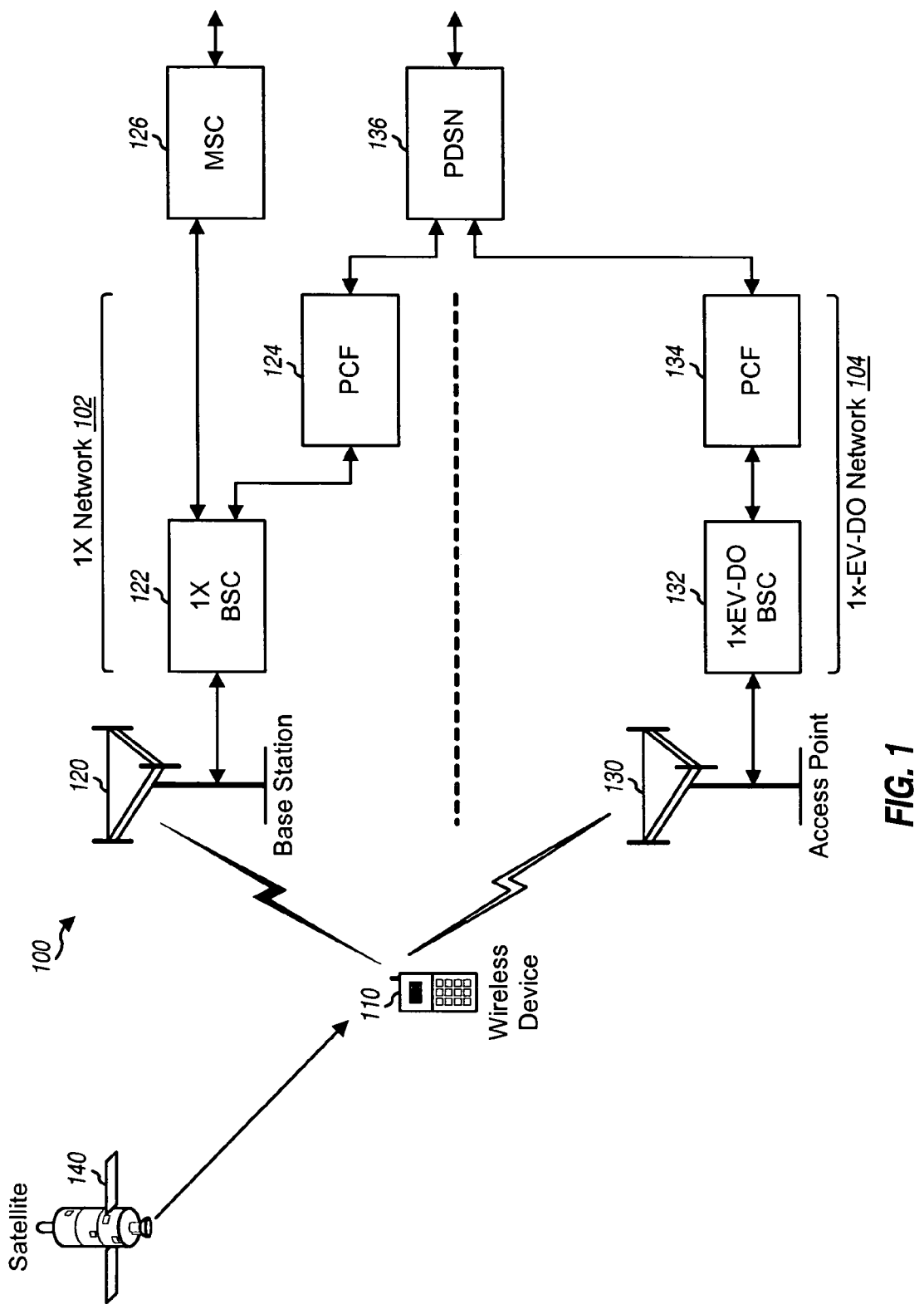
FIG. 1 shows a deployment of a 1X network and a 1xEV-DO network.

FIG. 1 shows a deployment 100 of a 1X network 102 and a 1xEV-DO network 104. 1X network 102 typically includes a number of base stations that provide radio communication for wireless devices located within the coverage of these base stations. Similarly, 1xEV-DO network 104 typically includes a number of access points that provide radio communication for wireless devices located within the coverage of these access points. For simplicity, only one base station 120 and one access point 130 are shown in FIG. 1. Base station 120 and access point 130 may be located at different sites or co-located at the same site. In general, a base station (1X terminology) is a fixed station that can communicate with wireless devices and may also be referred to as an access point (1xEV-DO terminology), a Node B (UMTS terminology), a base transceiver station (BTS), or some other terminology.

Base station 120 couples to a Base Station Controller (BSC) 122 that provides coordination and control for base station 120 and other base stations coupled to BSC 122. BSC 122 further couples to (1) a Packet Control Function (PCF) 124 that supports data services and (2) a Mobile Switching Center (MSC) 126 that supports voice services. MSC 126 provides routing for circuit-switched calls and performs mobility management for wireless devices located within the area served by the MSC.

Access point 130 couples to a BSC 132 that provides coordination and control for access point 130 and other access points coupled to BSC 132. BSC 132 further couples to a PCF 134 that supports data services. PCFs 124 and 134 also couple to a Packet Data Serving Node (PDSN) 136 and control the transmission of packet data between BSCs 122 and 132, respectively, and PDSN 136. The area served by each PCF is called a packet zone and is identified by a unique packet zone identifier (PZID). PDSN 136 supports data services for wireless devices in the 1X and 1xEV-DO networks. For example, PDSN 136 may be responsible for the establishment, maintenance, and termination of Point-to-Point Protocol (PPP) sessions for the wireless devices and may also assign dynamic Internet Protocol (IP) addresses to these wireless devices. PDSN 136 may couple to other public and/or private data networks, e.g., the Internet.

A hybrid/multi-mode wireless device 110 may be located anywhere within the coverage of 1X network 102 and 1xEV-DO network 104. In general, a wireless device may be fixed or mobile and may communicate with zero, one, or multiple base stations/access points at any given moment, depending on whether the wireless device is active and whether the wireless device is in handoff. A wireless device may also be referred to as a mobile station (1X terminology), an access terminal (1xEV-DO terminology), a user equipment (UMTS terminology), a subscriber station, or some other terminology. A wireless device may be a cellular phone, a personal digital assistant (PDA), a modem card, a handheld device, or some other wireless communication unit or device.

1X network 102 may provide voice and data services, which have different characteristics. For example, voice services typically require a common grade of service (GoS) for all users as well as relatively stringent delays. In contrast, data services may be able to tolerate different GoS for different users and variable delays. To support both voice and data services, 1X network 102 may first allocate network resources to voice users and then allocate any remaining network resources to data users who are able to tolerate longer delays. 1xEV-DO network 104 is optimized for data services, which are typically characterized by long periods of silence punctuated by bursts of traffic. 1xEV-DO 104 network allocates most or all of the network resources to one user at any given moment, thereby greatly increasing the peak data rate for the user being served.

A service provider may deploy overlapping 1× and 1xEV-DO networks to provide enhanced services for its subscribers. For example, 1X network 102 may be deployed over a large geographic area to provide voice and data services, and 1xEV-DO 104 network may be deployed in areas where data usage is expected to be high.

Hybrid/multi-mode wireless device 110 may be capable of communicating with both 1X network 102 and 1xEV-DO network 104. Wireless device 110 is typically able to receive service from one network at any given moment depending on the location of the wireless device and the desired service. Wireless device 110 may also be able to receive signals from satellites 140, which may be part of the Global Positioning System (GPS), the European Galileo system, or the Russian Glonass system. Wireless device 110 may receive signals from base stations in 1X network 102, signals from access points in 1xEV-DO network 104, and/or signals from satellites. Wireless device 110 may then obtain pseudo-range measurements for the base stations, access points, and/or satellites based on the received signals. The pseudo-range measurements may be used to derive a position estimate for wireless device 110.

Wireless device 110 may establish a data session with 1X network 102 to receive data service. For data session establishment, wireless device 110 may exchange signaling with various entities to set up protocols in a protocol stack used for data exchanges. The protocol stack may include, e.g., Transmission Control Protocol (TCP) and/or User Datagram Protocol (UDP) at a transport layer, IP at a network layer, PPP and Radio Link Protocol (RLP) at a link layer, and 1X air-link interface at a physical layer. Each protocol is terminated at a particular entity, and wireless device 110 may exchange signaling with that entity to set up the protocol. For example, wireless device 110 may exchange signaling with PDSN 136 to establish a PPP session and perform mobile IP registration, if applicable. Wireless device 110 and PDSN 136 may thereafter exchange packet data via serving BSC 122 and serving PCF 124. PDSN 136 maintains the data session for wireless device 110 for up to a predetermined lifetime, which is typically long (e.g., hours or days). Serving PCF 124 and PDSN 136 each store pertinent state information for the data session so that packet data may be exchanged between wireless device 110 and PDSN 136 during the data session. The state information may include, e.g., information for an A10 connection between PCF 124 and PDSN 136 for wireless device 110.

Wireless device 110 may thereafter move into the coverage of 1xEV-DO network 104. Wireless device 110 may be configured such that 1xEV-DO network 104 is a preferred network for data services. In this case, wireless device 110 may initiate a hand-up from 1X network 102 to 1xEV-DO network 104. As part of the hand-up process, wireless device 110 attempts to resynchronize the PPP session with PDSN 136 so that the new serving PCF 134 has pertinent state information for the data session and the A10 connection is between PDSN 136 and PCF 134. The PPP resynchronization allows packet data to be exchanged between wireless device 110 and PDSN 136 via the new serving PCF 134.

When wireless device 110 attempts to hand-up the data session from 1X network 102 to 1xEV-DO network 104, the PPP session may fail due to contention for resources at wireless device 110. Such resources may include a radio frequency (RF) receiver and/or other hardware. If the resources required for PPP resynchronization are used by another application, then the PPP session may time out and fail, which may then cause undesirable behavior (e.g., closed connection) for an active data application.

For example, wireless device 110 may have a single RF receiver that may be used to receive 1X, 1xEV-DO or GPS. A GPS application may take command of the RF receiver during a GPS session and may tune the RF receiver to a different frequency for an extended period of time in order to make measurements for GPS satellites. If a data application desires to resynchronize PPP for 1xEV-DO network 104, and if the GPS application holds the RF receiver during this period, then the PPP resynchronization may fail, e.g., due to a timeout. The failure in the PPP session may cause the entire protocol stack to be torn down and the connection to be reset. This may have detrimental impact on a data application, e.g., if wireless device 110 has already set up a secure connection or is in the middle of a download operation.

In an aspect, resources that are shared by multiple applications are arbitrated to avoid failures resulting from unavailable resources. As used herein, an application may be a software program, a firmware program, a software, firmware and/or hardware module (e.g., for a protocol in a protocol stack), or any other entity that uses a resource that is shared with other applications. Whenever an application desires to perform an operation (e.g., PPP resynchronization) that requires the use of a shared resource, a determination is made as to whether that resource is available. The operation may be delayed while the resource is unavailable. The application may be assigned the resource if it is available or becomes available and may then perform the operation. The resource is locked while the operation is pending to avoid assignment to another application. This resource arbitration allows applications to complete their operations without encountering failures due to other applications taking over the resources.

Figure 2A:
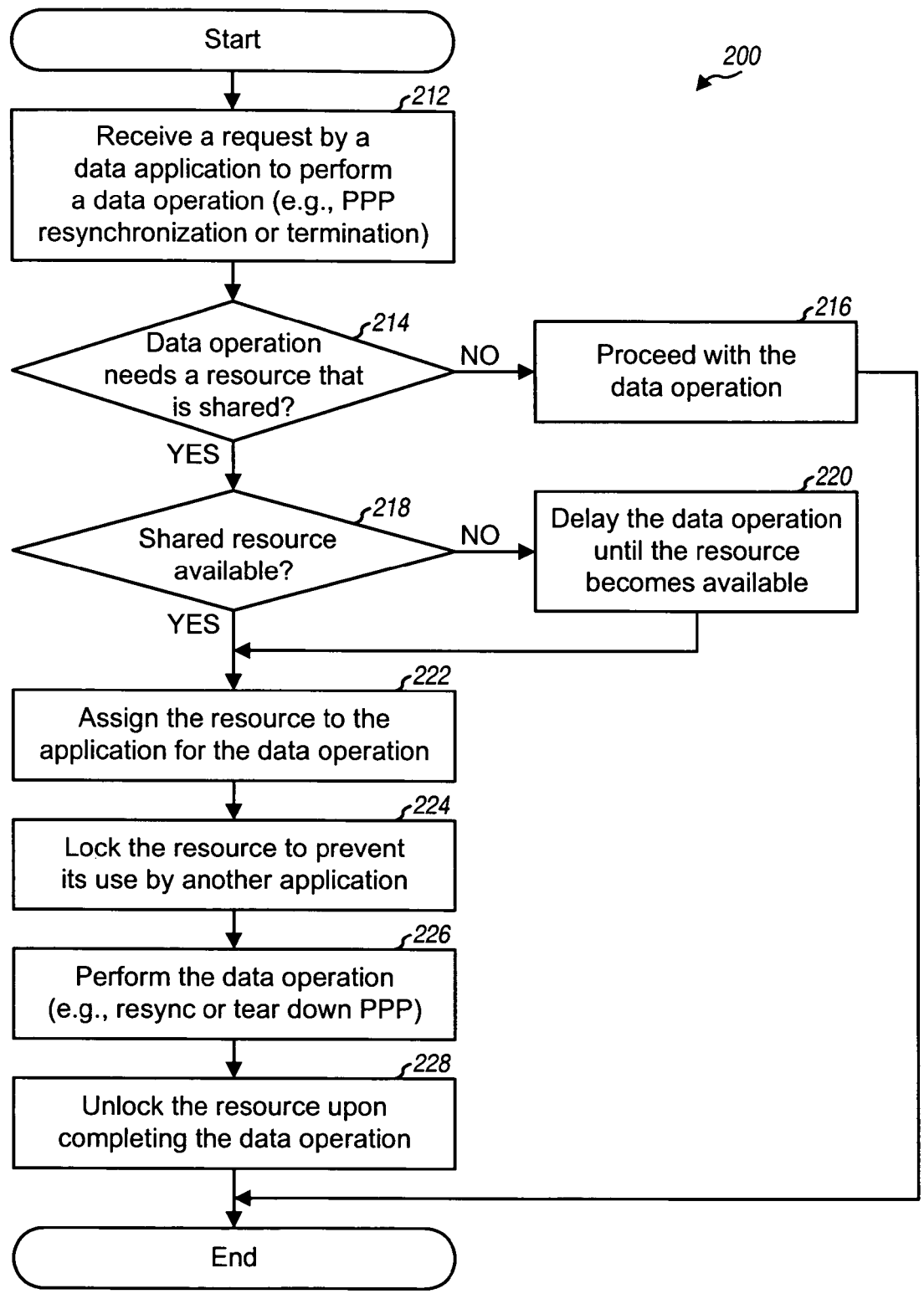
FIGS. 2A and 2B show processes for performing data and non-data operations, respectively, with resource arbitration.

FIG. 2A shows an embodiment of a process 200 for performing a data operation with resource arbitration. Initially, a request to perform a data operation is received from a data application (block 212). This data operation may be for PPP resynchronization for handoff of a data session from one wireless network to another wireless network. The handoff may be, e.g., hand-up from 1X network 102 to 1xEV-DO network 104 or hand-down from 1xEV-DO network 104 to 1X network 102. The data operation may also be for termination or tear down of a data session (e.g., a PPP session), mobile IP re-registration or de-registration, TCP session cleanup to avoid a stale TCP session on a server and to avoid denial of service due to many stale sessions, and so on. It may be desirable to successfully complete handoff of a data session, e.g., for the reasons noted above. It may also be desirable to successfully terminate a data session so that all affected entities are aware of the status of the data session and no entity wastes network resources to maintain or close out the data session. In general, the data operation may be any action that relates to a data session and benefits from uninterrupted use of the resources needed for the operation.

In general, a request for an operation may be initiated by an application running at wireless device 110, a wireless network, a remote entity, or some other entity. For example, a PPP resync may be initiated by PDSN 136, a TCP close request may come from a remote TCP server, and so on. Each external request may be handled by a designated application running at wireless device 110. This application may then submit the request for the operation.

A determination is then made whether the data operation needs a resource that is shared with other applications (block 214). The shared resource may be an RF receiver, processing hardware, an input/output (I/O) interface, and so on. If the data operation does not need a resource that is shared, then the data operation can proceed (block 216), and the process thereafter terminates. However, if the data operation needs a resource that is shared, as determined in block 214, then a determination is made whether that resource is available (block 218). If the resource is not available, then the data operation is delayed until the resource becomes available (block 220). The data operation may be such that it is better to delay the operation than to attempt the operation and risk failure and its adverse consequences. If the resource is available (as determined in block 218) or becomes available (after block 220), then the resource is assigned to the application for the data operation (block 222) and is locked to prevent its use by another application (block 224). The data operation (e.g., PPP resynchronization or termination) is then performed using the resource (block 226). Upon completing the data operation, the resource is unlocked to allow other applications to use the resource (block 228). Another application that is waiting for the resource may be notified when the resource becomes available, e.g., so that the application can try to acquire the resource.

Figure 2B:
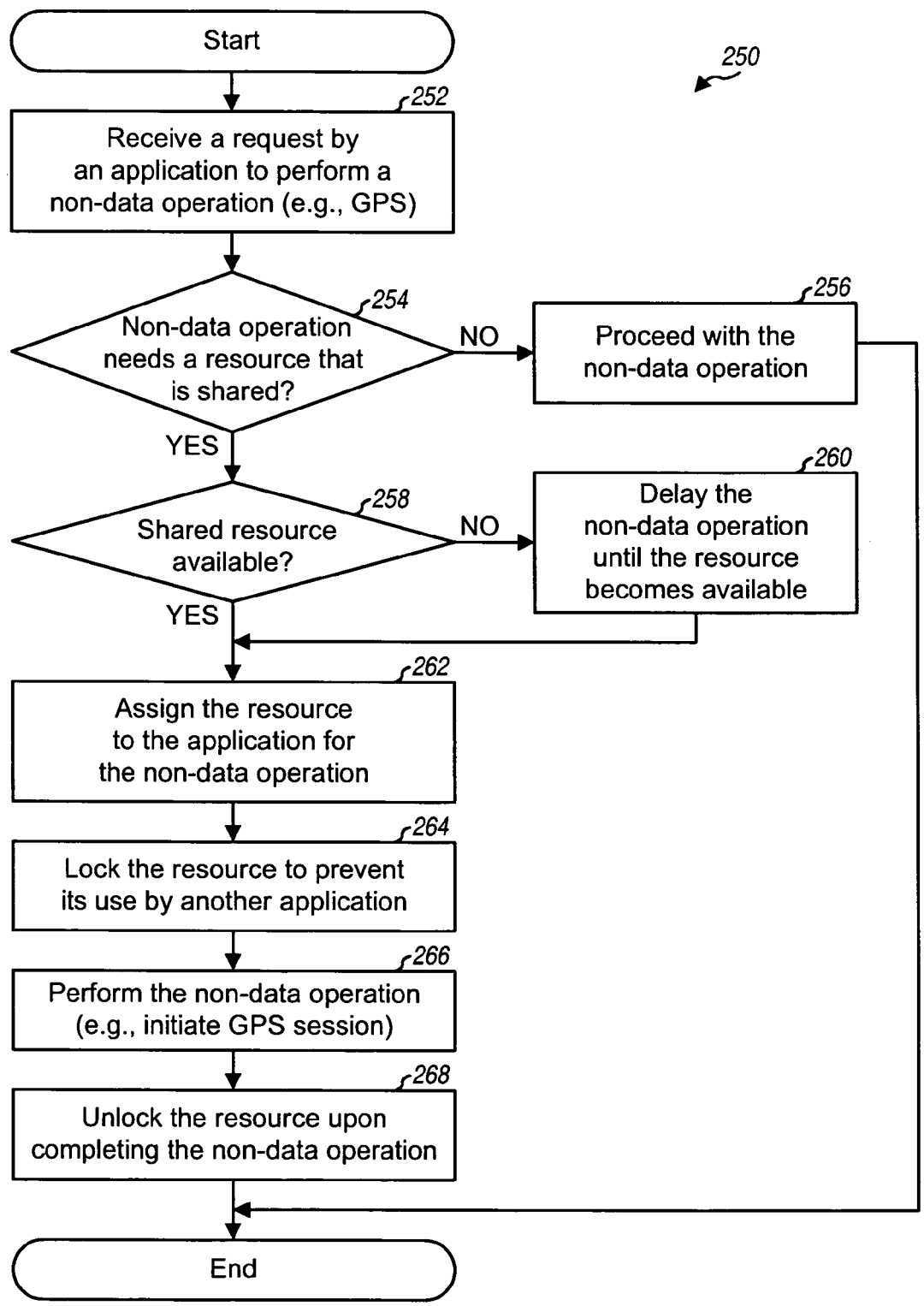

FIG. 2B shows an embodiment of a process 250 for performing a non-data operation with resource arbitration. Initially, a request to perform a non-data operation is received from an application (block 252). This non-data operation may be for a GPS session or a GPS operation to obtain a position estimate for wireless device 110, an inter-system RF measurement, and so on. In general, the non-data operation may be any action that does not relate to a data session and benefits from uninterrupted use of the resources needed for the operation.

A determination is then made whether the non-data operation needs a resource that is shared with other applications (block 254). The shared resource may be an RF receiver, processing hardware, an I/O interface, and so on. If the non-data operation does not need a resource that is shared, then the non-data operation can proceed (block 256), and the process thereafter terminates. However, if the non-data operation needs a resource that is shared, then a determination is made whether that resource is available (block 258). If the resource is not available, then the non-data operation is delayed until the resource becomes available (block 260). If the resource is available or becomes available, then the resource is assigned to the application for the non-data operation (block 262) and is locked to prevent its use by another application (block 264). The non-data operation is then performed (e.g., a GPS session is initiated) using the resource (block 266). Upon completing the non-data operation, the resource is unlocked to allow other applications to use the resource (block 268).

In the embodiments shown in FIGS. 2A and 2B, wireless device 110 identifies resource contention among different sessions, e.g., for PPP, GPS, and so on. Wireless device 110 throttles or backs off one of the sessions (e.g., PPP in FIG. 2A and GPS in FIG. 2B) when resource contention is detected. In FIG. 2A, the PPP session is throttled until the resource under contention becomes available, thereby avoiding PPP session failure due to resource unavailability. Once the resource is available, the PPP session can proceed as normal. During certain key PPP operation (e.g., PPP session establishment, resynchronization, or termination), the resource is not allowed to be used for a purpose that is contentious to the PPP operation.

Figure 3A:
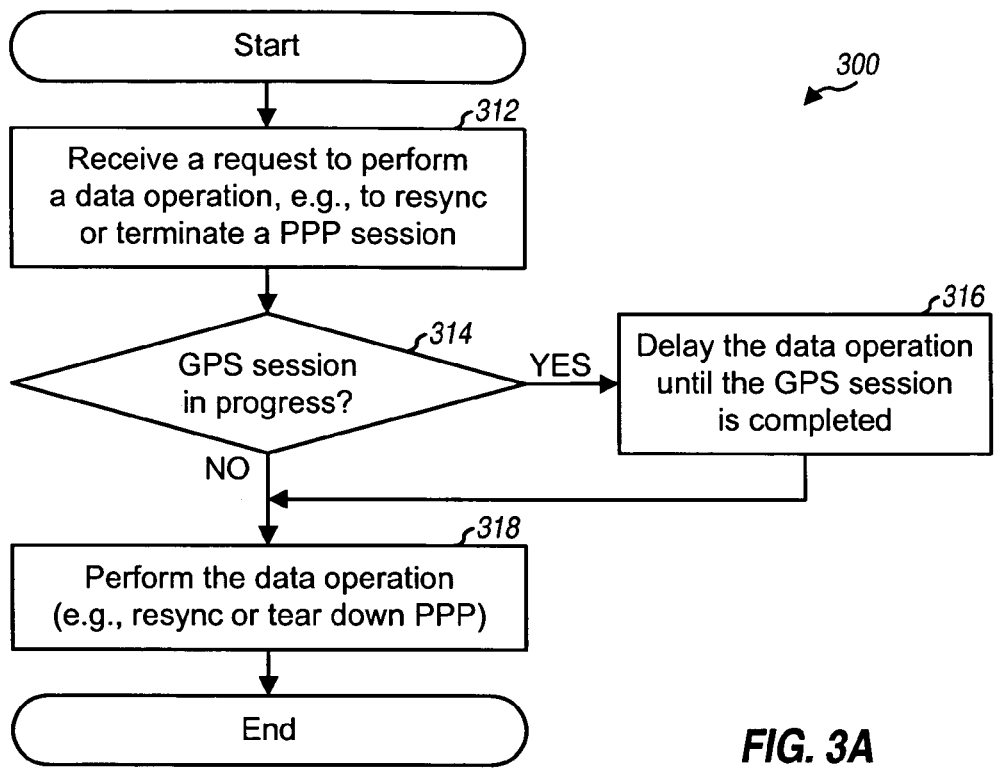
FIGS. 3A and 3B show processes for arbitrating between a data session and a GPS session.

FIG. 3A shows an embodiment of a process 300 for arbitrating between a data session and a GPS session. In this embodiment, the data session and the GPS session share a resource (e.g., an RF receiver) that is needed by both sessions, but only one session can use this shared resource at any given moment. Initially, a request is received to perform a data operation for the data session, e.g., to resynchronize or terminate a PPP session (block 312). A determination is then made whether the GPS session is in progress (block 314). If the answer is 'Yes', then the data operation is delayed until the GPS session is completed or gracefully stalled or terminated (block 316). If the GPS session is not in progress (as determined in block 314) or has completed (after block 316), then the data operation is performed (block 318).

Figure 3B:
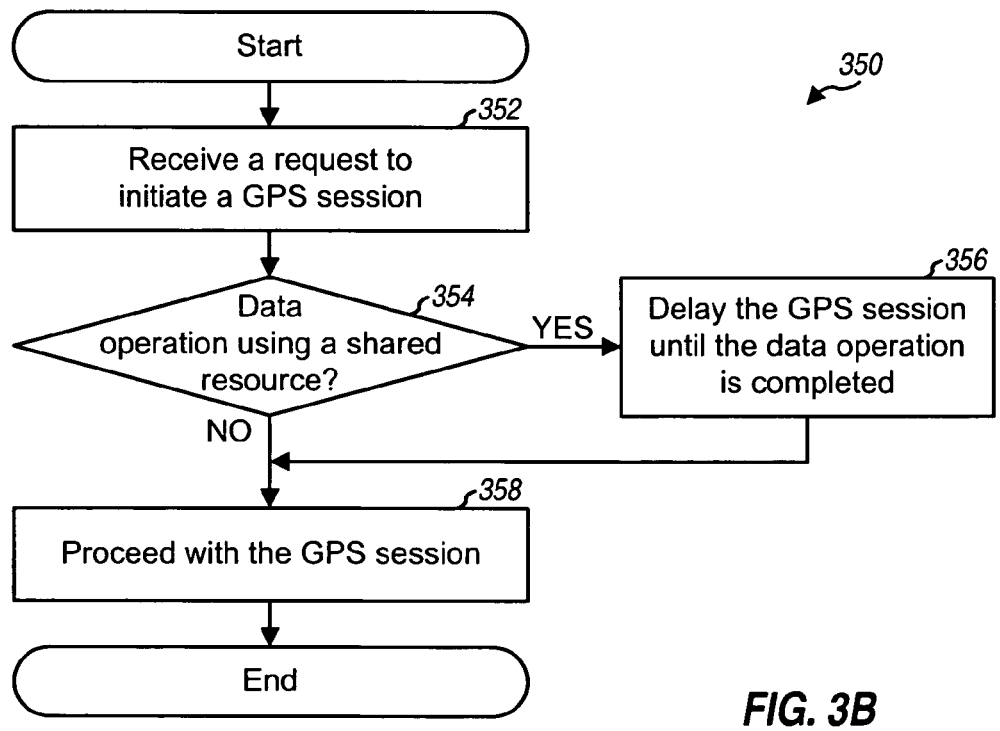

FIG. 3B shows an embodiment of a process 350 for arbitrating between a data session and a GPS session. Initially, a request is received to initiate a GPS session (block 352). A determination is then made whether a data operation (e.g., for PPP resynchronization or termination) is using a resource needed for the GPS session (block 354). If the answer is 'Yes', then the GPS session is delayed until the data operation is completed (block 356). If the shared resource is not being used (as determined in block 354) or becomes available (after block 356), then the GPS session proceeds (block 358).

FIGS. 3A and 3B show specific embodiments for arbitrating between data and GPS sessions. In FIG. 3A, if wireless device 110 desires to hand-up or resynchronize PPP, then wireless device 110 first determines whether the GPS application is utilizing the shared resource. If such is the case, then wireless device 110 delays the PPP hand-up or resynchronization operation until the GPS session is finished. In FIG. 3B, if the GPS application desires to start a GPS session, then wireless device 110 first determines whether the data application is utilizing the shared resource and, if yes, delays the GPS session until the data application completes the data operation.

The techniques described herein may be used to arbitrate any type of resource that may be shared. For example, the shared resources may be an RF receiver/transmitter, a hardware processing unit, a memory device, an I/O interface, an I/O device, and so on. Furthermore, the techniques may be used to arbitrate among any types of applications that may share resources. For example, these applications may be data applications, GPS applications, I/O applications, circuit switched applications (e.g., voice, fax-data, short message service (SMS)/short data burst (SDB), etc.), security protocols (e.g., DSP access for computationally intensive tasks), and so on.

FIG. 4A shows an embodiment of a resource table 400 that may be maintained by wireless device 110 to keep track of the status of shared resources at the wireless device. In this embodiment, table 400 includes a column 412 for the resources that are shared, a column 414 that indicates whether the resources have been assigned, a column 416 that indicates the applications to which the resources are assigned, and a column 418 that indicates the applications waiting for the resources. Table 400 may include a row for each resource that is shared. In the embodiment shown in FIG. 4A, the shared resources include an RF receiver and a digital signal processor (DSP). Whenever a given resource is assigned, that resource may be marked as locked in a corresponding field of column 414, and the application to which the resource is assigned may be noted in a corresponding field of column 416. For each resource, a corresponding field of column 418 indicates other applications, if any, waiting for that resource. The waiting applications may be ordered based on the order in which they request the resource, their priorities, or in some other manner. Wireless device 110 can quickly determine whether a given resource has been assigned by checking table 400. Wireless device 110 can also quickly determine which applications are waiting for each resource and can notify the highest priority application or all waiting applications when the resource becomes available.

FIG. 4B shows an embodiment of an application table 450 that may be maintained by wireless device 110 to identify shared resources needed by different applications at the wireless device. In this embodiment, table 450 includes a column 452 for the applications using shared resources and one column 454 for each resource that is shared. In the embodiment shown in FIG. 4B, the shared resources include an RF receiver and a DSP.

Table 450 may include a row for each application that uses a shared resource. For each application, each resource used by that application may be marked (e.g., with an "X") in a corresponding field of the column for that resource. In the example shown in FIG. 4B, the data application uses the RF receiver and the DSP, the GPS application uses the RF receiver, and so on. Whenever wireless device 110 receives a request by a given application, the wireless device can use table 450 to quickly determine which shared resources, if any, are needed by that application. Wireless device 110 may first check to see if the application is listed in column 452 and, if yes, may identify which resource(s) are marked for that application in columns 454. Wireless device 110 can then ascertain whether the required resource(s) are available by checking table 400 in FIG. 4A.

In the embodiments described above, the applications sharing common resources at wireless device 110 have equal priority. In these embodiments, the first application to request a given resource is assigned that resource, and all other applications wait until the first application completes its operation and the resource becomes available, as described above in FIGS. 2A through 3B. The resource may be automatically assigned to the next waiting application (e.g., asynchronously) in a first come first serve order.

In other embodiments, the applications may have different priorities, and the resources may be assigned based on their availability as well as the priorities of the applications. For example, an application with a higher priority may be able to bump another application with a lower priority from a resource needed by the higher priority application. This avoids a scenario in which the higher priority application needs to wait an indefinite amount of time until the lower priority application completes its operation. The priority of each application may be static, e.g., determined by the user, the service provider, and so on. The priority of each application may also be dynamically set, e.g., based on the operation to be performed, the state of the application, and so on. For example, PPP resynchronization may be given higher priority if the data session is active (e.g., downloading) and may be given lower priority if the data session is dormant. The applications waiting for a given resource may be ranked based on their priorities. The resource may be automatically assigned to the waiting application with the highest priority when the resource becomes available. A given resource may also be assigned in other manners.

Figure 5:
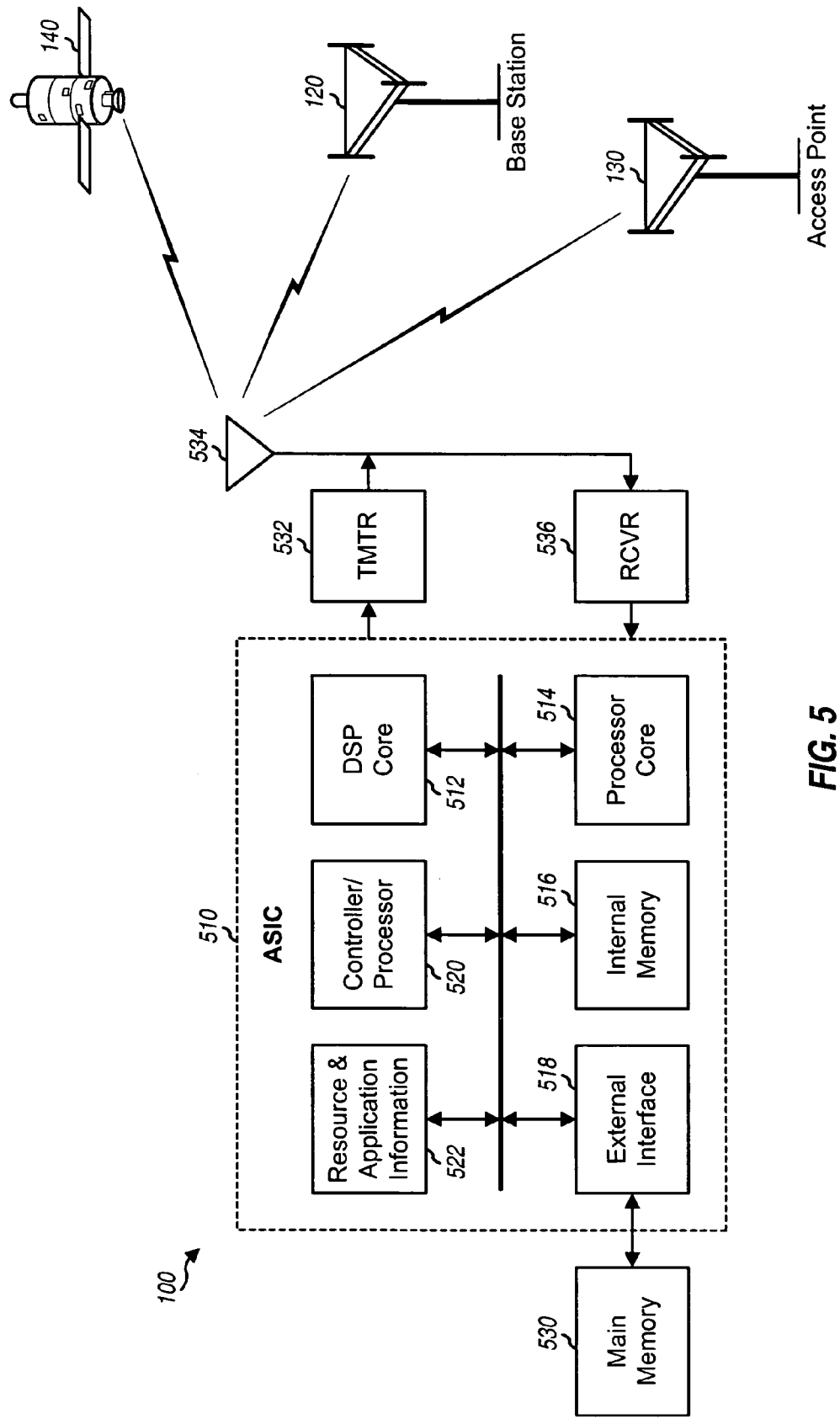
FIG. 5 shows a block diagram of a wireless device.

FIG. 5 shows a block diagram of an embodiment of wireless device 110. On the transmit path, an application specific integrated circuit (ASIC) 510 processes data to be transmitted and provides data chips to a transmitter (TMTR) 532. Transmitter 532 processes (e.g., converts to analog, filters, amplifies, and frequency upconverts) the data chips and generates a modulated signal, which is transmitted via an antenna 534. On the receive path, antenna 534 receives signals transmitted by base stations, access points and/or satellites and provides received signals to a receiver (RCVR) 536. Receiver 536 processes (e.g., filters, amplifies, frequency downconverts, and digitizes) the received signals and provides samples to ASIC 510 for further processing.

ASIC 510 includes various processing units that support communication with one or more wireless networks. In the embodiment shown in FIG. 5, ASIC 510 includes a DSP core 512, a processor core 514, an internal memory 516, an external interface unit 518, a controller/processor 520, and a memory 522. DSP core 512 performs processing (e.g., encoding and modulation) for the transmit path, processing (e.g., demodulation and decoding) for the receive path, and processing (e.g., decoding) for GPS and/or other systems and applications. DSP core 512 may include one or more multiply-and-accumulate (MAC) units, one or more arithmetic logic units (ALUs), and so on. Processor core 514 supports various functions such as video, audio, graphics, gaming, and so on.

Controller/processor 520 directs the operation of various processing units at wireless device 110. Controller/processor 520 may implement or direct processes 200, 250, 300 and/or 350 in FIGS. 2A through 3B. Internal memory 516 stores data and program codes used by the processing units within ASIC 510. Memory 522 stores resource and application information, e.g., table 400 in FIG. 4A and/or table 450 in FIG. 4B. External interface unit 518 interfaces with other units external to ASIC 510 such as a main memory 530, which may provide bulk storage for program codes and data for wireless device 110.

In general, wireless device 110 may include any number of integrated circuits, and each integrated circuit may include any number and any type of processing units. The number of processing units and the types of processing units at wireless device 110 are typically dependent on various factors such as the communication networks, applications, and functions supported by wireless device 110.

The resource arbitration techniques described herein may be implemented by various means. For example, these techniques may be implemented in hardware, firmware, software, or a combination thereof. For a hardware implementation, the processing units used for resource arbitration may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the resource arbitration techniques may be implemented with modules (e.g., procedures, functions, and so on) that perform the functions described herein. The firmware and/or software codes may be stored in a memory (e.g., memory 516 or 530 in FIG. 5) and executed by a processor (e.g., processor 520). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device comprising:
a resource shared by a plurality of applications and usable by only one of the plurality of applications at a time; and
a controller configured to:
receive a request by an application of the plurality of applications to perform an operation requiring use of the resource, to determine whether the resource is available and, if the resource is unavailable, to delay the operation until the resource becomes available;
dynamically set a priority of each of the applications based on whether the operation to be performed by the application is a data operation, based on whether the operation to be performed by the application is a non-data operation, based on whether an active application currently using the resource is performing the data operation, and based on whether the active application currently using the resource is performing the non-data operation, such that a first application configured to perform the data operation including a Point-to-Point Protocol (PPP) related session is set as having a lower priority than a second application configured to perform the non-data operation including a Global Positioning System (GPS) related session when the active application currently using the resource is performing the non-data operation including the GPS related session, and such that the second application configured to perform the non-data operation including the GPS related session is set as having a lower priority than the first application configured to perform the data operation including the PPP related session when the active application currently using the resource is performing the data operation including the PPP related session;
wherein the priority of each of the applications is set dynamically and on an external wireless request such that the first application configured to perform a first operation including one of a handoff of the data session from a first wireless network to a second wireless network, resynchronization of a PPP session, termination of a PPP session, mobile IP re-registration, mobile IP de-registration, or Transmission Control Protocol (TCP) session cleanup is set as having a lower priority than the second application configured to perform a second operation including one of a GPS session, a GPS operation to obtain a position estimate, or an inter-system Radio Frequency (RF) measurement when the active application currently using the resource is performing the second operation; and
wherein the data operation is any first type of action that relates to a data session, and the non-data operation is any second type of action that does not relate to the data session.

2. The wireless device of claim 1, wherein the controller is configured to assign the resource, if available, to the application for the operation and to lock the resource from being assigned to another application while the operation is pending.

3. The wireless device of claim 2, wherein the controller is configured to unlock the resource upon completion of the operation.

4. The wireless device of claim 3, wherein the controller is configured to notify another application waiting for the resource when the resource becomes available.

5. The wireless device of claim 1, wherein the controller is configured to assign the resource to applications requesting the resource based on an order in which the resource is requested.

6. The wireless device of claim 1, further comprising:
a memory configured to store a table of at least one resource shared by the plurality of applications, wherein the table indicates whether each of the at least one resource is currently assigned to any application.

7. The wireless device of claim 1, further comprising:
a memory configured to store a table of a plurality of applications sharing at least one resource, wherein the table indicates one or more shared resources required by each of the plurality of applications.

8. The wireless device of claim 1, wherein the resource is a radio frequency (RF) receiver.

9. The wireless device of claim 1, wherein the resource is a digital signal processor (DSP).

10. The wireless device of claim 1, wherein the plurality of applications comprise a Global Positioning System (GPS) application, and wherein the operation is for a GPS session.

11. The wireless device of claim 1, wherein the plurality of applications comprise a data application.

12. The wireless device of claim 1, wherein the operation is for handoff of the data session from a first wireless network to a second wireless network.

13. The wireless device of claim 1, wherein the operation is for termination of the data session.

14. The wireless device of claim 1, wherein the operation is for resynchronization of a Point-to-Point Protocol (PPP) session.

15. The wireless device of claim 1, wherein the operation is for termination of a Point-to-Point Protocol (PPP) session.

16. The wireless device of claim 1, wherein the operation is for resynchronization of a Point-to-Point Protocol (PPP) session for hand-up from a CDMA2000 1X network to a CDMA2000 1xEV-DO network.

17. The wireless device of claim 1, wherein the operation is for resynchronization of a Point-to-Point Protocol (PPP) session for hand-down from a CDMA2000 1xEV-DO network to a CDMA2000 1X network.

18. The wireless device of claim 1, wherein the operation is for mobile IP reregistration, mobile IP de-registration, or TCP session cleanup.

19. The wireless device of claim 1, wherein the controller is further configured to set a first application configured to perform the data operation as having a higher priority than a second application configured to perform the non-data operation when the data session is active.

20. The wireless device of claim 19, wherein the data operation is for resynchronization of a Point-to-Point Protocol (PPP) session.

21. The wireless device of claim 20, wherein the non-data operation is for a Global Positioning System (GPS) session.

22. The wireless device of claim 1, wherein the controller is further configured to set a first application configured to perform the data operation as having a lower priority than a second application configured to perform the non-data operation when a non-data session is active.

23. The wireless device of claim 22, wherein the data operation is for resynchronization of a Point-to-Point Protocol (PPP) session.

24. The wireless device of claim 23, wherein the non-data operation is for a Global Positioning System (GPS) session.

25. The wireless device of claim 1, wherein the data operation is for handoff of the data session from a first wireless network to a second wireless network, resynchronization of a Point-to-Point Protocol (PPP) session, termination of a PPP session, mobile IP re-registration, mobile IP de-registration, or Transmission Control Protocol (TCP) session cleanup.

26. The wireless device of claim 1, wherein the non-data operation is for a Global Positioning System (GPS) session, a GPS operation to obtain a position estimate, or an inter-system Radio Frequency (RF) measurement.

27. The wireless device of claim 1, wherein the controller is further configured to set the application configured to perform the data operation as having a higher priority than the application configured to perform the non-data operation when the active application currently using the resource is performing the data operation.

28. The wireless device of claim 1, wherein the controller is further configured to set a first application configured to perform the data operation as having a lower priority than a second application configured to perform the non-data operation when the active application currently using the resource is performing the non-data operation.

29. A method comprising:
receiving, at a hardware controller, a request by an application of a plurality of applications to perform an operation requiring use of a resource that is shared by the plurality of applications and usable by only one of the plurality of applications at a time;
determining whether the resource is available;
delaying the operation, if the resource is unavailable, until the resource becomes available;
dynamically setting a priority of each of the applications based on whether the operation to be performed by the application is a data operation, based on whether the operation to be performed by the application is a non-data operation, based on whether an active application currently using the resource is performing the data operation, and based on whether the active application currently using the resource is performing the non-data operation, such that a first application configured to perform the data operation including a Point-to-Point Protocol (PPP) related session is set as having a lower priority than a second application configured to perform the non-data operation including a Global Positioning System (GPS) related session when the active application currently using the resource is performing the non-data operation including the GPS related session, and such that the second application configured to perform the non-data operation including the GPS related session is set as having a lower priority than the first application configured to perform the data operation including the PPP related session when the active application currently using the resource is performing the data operation including the PPP related session;
wherein the priority of each of the applications is set dynamically and on an external wireless request such that the first application configured to perform a first operation including one of a handoff of the data session from a first wireless network to a second wireless network, resynchronization of a PPP session, termination of a PPP session, mobile IP re-registration, mobile IP de-registration, or Transmission Control Protocol (TCP) session cleanup is set as having a lower priority than the second application configured to perform a second operation including one of a GPS session, a GPS operation to obtain a position estimate, or an inter-system Radio Frequency (RF) measurement when the active application currently using the resource is performing the second operation; and
wherein the data operation is any first type of action that relates to a data session, and the non-data operation is any second type of action that does not relate to the data session.

30. The method of claim 29, further comprising:
assigning the resource, if available, to the application for the operation; and locking the resource from being assigned to another application while the operation is pending.

31. The method of claim 30, further comprising:
unlocking the resource upon completion of the operation.

32. The method of claim 30, further comprising:
performing resynchronization of a Point-to-Point Protocol (PPP) session for the operation.

33. The method of claim 29, further comprising setting a first application configured to perform the data operation as having a higher priority than a second application configured to perform the non-data operation when the data session is active.

34. The method of claim 33, wherein the data operation is for resynchronization of a Point-to-Point Protocol (PPP) session.

35. The method of claim 34, wherein the non-data operation is for a Global Positioning System (GPS) session.

36. The method of claim 29, further comprising setting a first application configured to perform the data operation as having a lower priority than a second application configured to perform the non-data operation when a non-data session is active.

37. The method of claim 36, wherein the data operation is for resynchronization of a Point-to-Point Protocol (PPP) session.

38. The method of claim 37, wherein the non-data operation is for a Global Positioning System (GPS) session.

39. The method claim 29, wherein the data operation is for handoff of the data session from a first wireless network to a second wireless network, resynchronization of a Point-to-Point Protocol (PPP) session, termination of a PPP session, mobile IP reregistration, mobile IP de-registration, or Transmission Control Protocol (TCP) session cleanup.

40. The method of claim 29, wherein the non-data operation is for a Global Positioning System (GPS) session, a GPS operation to obtain a position estimate, or an inter-system Radio Frequency (RF) measurement.

41. The method of claim 29, further comprising setting a first application configured to perform the data operation as having a higher priority than a second application configured to perform the non-data operation when the active application currently using the resource is performing the data operation.

42. The method of claim 29, further comprising setting a first application configured to perform the data operation as having a lower priority than a second application configured to perform the non-data operation when the active application currently using the resource is performing the non-data operation.

43. An apparatus comprising:
means for receiving a request by an application of a plurality of applications to perform an operation requiring use of a resource that is shared by the plurality of applications and usable by only one of the plurality of applications at a time;
means for determining whether the resource is available;
means for delaying the operation, if the resource is unavailable, until the resource becomes available;
means for determining priorities of the applications requesting for the resource and to assign the resource to the requesting applications based on the priorities of the applications;
means for dynamically setting a priority of each of the applications based on whether the operation to be performed by the application is a data operation, based on whether the operation to be performed by the application is a non-data operation, based on whether an active application currently using the resource is performing the data operation, and based on whether the active application currently using the resource is performing the non-data operation, such that a first application configured to perform the data operation including a Point-to-Point Protocol (PPP) related session is set as having a lower priority than a second application configured to perform the non-data operation including a Global Positioning System (GPS) related session when the active application currently using the resource is performing the non-data operation including the GPS related session, and such that the second application configured to perform the non-data operation including the GPS related session is set as having a lower priority than the first application configured to perform the data operation including the PPP related session when the active application currently using the resource is performing the data operation including the PPP related session;
wherein the priority of each of the applications is set dynamically and on an external wireless request such that the first application configured to perform a first operation including one of a handoff of the data session from a first wireless network to a second wireless network, resynchronization of a PPP session, termination of a PPP session, mobile IP re-registration, mobile IP de-registration, or Transmission Control Protocol (TCP) session cleanup is set as having a lower priority than the second application configured to perform a second operation including one of a GPS session, a GPS operation to obtain a position estimate, or an inter-system Radio Frequency (RF) measurement when the active application currently using the resource is performing the second operation; and
wherein the data operation is any first type of action that relates to a data session, and the non-data operation is any second type of action that does not relate to the data session.

44. The apparatus of claim 43, further comprising:
means for assigning the resource, if available, to the application for the operation; and
means for locking the resource from being assigned to another application while the operation is pending.

45. The apparatus of claim 44, further comprising:
means for unlocking the resource upon completion of the operation.

46. The apparatus of claim 44, further comprising:
means for performing resynchronization of a Point-to-Point Protocol (PPP) session for the operation.

47. The apparatus of claim 43, further comprising means for setting a first application configured to perform the data operation as having a higher priority than a second application configured to perform the non-data operation when the data session is active.

48. The apparatus of claim 43, further comprising means for setting a first application configured to perform the data operation as having a lower priority than a second application configured to perform the non-data operation when a non-data session is active.

49. The apparatus of claim 43, wherein the data operation is for handoff of the data session from a first wireless network to a second wireless network, resynchronization of a Point-to-Point Protocol (PPP) session, termination of a PPP session, mobile IP re-registration, mobile IP de-registration, or Transmission Control Protocol (TCP) session cleanup.

50. The apparatus of claim 43, wherein the non-data operation is for a Global Positioning System (GPS) session, a GPS operation to obtain a position estimate, or an inter-system Radio Frequency (RF) measurement.

51. The apparatus of claim 43, further comprising means for setting a first application configured to perform the data operation as having a higher priority than a second application configured to perform the non-data operation when the active application currently using the resource is performing the data operation.

52. The apparatus of claim 43, further comprising means for setting a first application configured to perform the data operation as having a lower priority than a second application configured to perform the non-data operation when the active application currently using the resource is performing the non-data operation.

53. A computer program product, comprising:
a non-transitory processor readable media comprising instructions operable in a wireless device to:
receive a request by an application of the plurality of applications to perform an operation requiring use of a resource that is shared by the plurality of applications and usable by only one of the plurality of applications at a time;
determine whether the resource is available;
delay the operation, if the resource is unavailable, until the resource becomes available;

determine priorities of the applications requesting for the resource and to assign the resource to the requesting applications based on the priorities of the applications;

dynamically setting a priority of each of the applications based on whether the operation to be performed by the application is a data operation, based on whether the operation to be performed by the application is a non-data operation, based on whether an active application currently using the resource is performing the data operation, and based on whether the active application currently using the resource is performing the non-data operation, such that a first application configured to perform the data operation including a Point-to-Point Protocol (PPP) related session is set as having a lower priority than a second application configured to perform the non-data operation including a Global Positioning System (GPS) related session when the active application currently using the resource is performing the non-data operation including the GPS related session, and such that the second application configured to perform the non-data operation including the GPS related session is set as having a lower priority than the first application configured to perform the data operation including the PPP related session when the active application currently using the resource is performing the data operation including the PPP related session;

wherein the priority of each of the applications is set dynamically and on an external wireless request such that the first application configured to perform a first operation including one of a handoff of the data session from a first wireless network to a second wireless network, resynchronization of a PPP session, termination of a PPP session, mobile IP re-registration, mobile IP de-registration, or Transmission Control Protocol (TCP) session cleanup is set as having a lower priority than the second application configured to perform a second operation including one of a GPS session, a GPS operation to obtain a position estimate, or an inter-system Radio Frequency (RF) measurement when the active application currently using the resource is performing the second operation; and wherein the data operation is any first type of action that relates to a data session, and the non-data operation is any second type of action that does not relate to the data session.

54. The computer program product of claim 53, wherein the non-transitory processor readable media further comprises instructions operable to:
assign the resource, if available, to the application for the operation; and lock the resource from being assigned to another application while the operation is pending.

55. The computer program product of claim 54, wherein the non-transitory processor readable media further comprises instructions operable to:
unlock the resource upon completion of the operation.

56. The computer program product of claim 54, wherein the non-transitory processor readable media further comprises instructions operable to:
perform resynchronization of a Point-to-Point Protocol (PPP) session for the operation.

57. The computer program product of claim 53, wherein the non-transitory processor readable media further comprises instructions operable to:
set a first application configured to perform the data operation as having a higher priority than a second application configured to perform the non-data operation when the data session is active.

58. The computer program product of claim 53, wherein the non-transitory processor readable media further comprises instructions operable to:
set a first application configured to perform the data operation as having a lower priority than a second application configured to perform the non-data operation when a non-data session is active.

59. The computer program product of claim 53, wherein the data operation is for handoff of the data session from a first wireless network to a second wireless network, resynchronization of a Point-to-Point Protocol (PPP) session, termination of a PPP session, mobile IP re-registration, mobile IP de-registration, or Transmission Control Protocol (TCP) session cleanup.

60. The computer program product of claim 53, wherein the non-data operation is for a Global Positioning System (GPS) session, a GPS operation to obtain a position estimate, or an inter-system Radio Frequency (RF) measurement.

61. The computer program product of claim 53, wherein the non-transitory processor readable media further comprises instructions operable to:
set a first application configured to perform the data operation as having a higher priority than a second application configured to perform the non-data operation when the active application currently using the resource is performing the data operation.

62. The computer program product of claim 53, wherein the non-transitory processor readable media further comprises instructions operable to:
set a first application configured to perform the data operation as having a lower priority than a second application configured to perform the non-data operation when the active application currently using the resource is performing the non-data operation.

63. At least one processor, comprising:
a first processing unit, comprising hardware, configured to receive a request by an application of a plurality of applications to perform an operation requiring use of a resource that is shared by the plurality of applications and usable by only one of the plurality of applications at a time;
a second processing unit configured to determine whether the resource is available;
a third processing unit configured to delay the operation, if the resource is unavailable, until the resource becomes available;
a fourth processing unit configured to determine priorities of the applications requesting for the resource and to assign the resource to the requesting applications based on the priorities of the applications;
a fifth processing unit configured to dynamically set a priority of each of the applications based on whether the operation to be performed by the application is a data operation, based on whether the operation to be performed by the application is a non-data operation, based on whether an active application currently using the resource is performing the data operation, and based on whether the active application currently using the resource is performing the non-data operation, such that a first application configured to perform the data operation including a Point-to-Point Protocol (PPP) related session is set as having a lower priority than a second application configured to perform the non-data operation including a Global Positioning System (GPS) related session when the active application currently using the resource is performing the non-data operation including the GPS related session, and such that the second application configured to perform the non-data operation including the GPS related session is set as having a lower priority than the first application configured to perform the data operation including the PPP related session when the active application currently using the resource is performing the data operation including the PPP related session;

wherein the priority of each of the applications is set dynamically and on an external wireless request such that the first application configured to perform a first operation including one of a handoff of the data session from a first wireless network to a second wireless network, resynchronization of a PPP session, termination of a PPP session, mobile IP re-registration, mobile IP de-registration, or Transmission Control Protocol (TCP) session clean up is set as having a lower priority than the second application configured to perform a second operation including one of a GPS session, a GPS operation to obtain a position estimate, or an inter-system Radio Frequency (RF) measurement when the active application currently using the resource is performing the second operation; and wherein the data operation is any first type of action that relates to a data session, and the non-data operation is any second type of action that does not relate to the data session.

* * * * *